United States Patent [19]

Aghazadeh et al.

[11] 4,157,573
[45] Jun. 5, 1979

[54] DIGITAL DATA ENCODING AND RECONSTRUCTION CIRCUIT

[75] Inventors: Shirzad Aghazadeh; Howard L. Stahle, both of Burbank, Calif.

[73] Assignee: The Singer Company, New York, N.Y.

[21] Appl. No.: 818,265

[22] Filed: Jul. 22, 1977

[51] Int. Cl.² ............................................. G11B 5/02
[52] U.S. Cl. ........................................................ 360/51
[58] Field of Search ...................... 360/53, 51, 40, 42

[56] References Cited

U.S. PATENT DOCUMENTS

| | | | |
|---|---|---|---|
| 3,243,580 | 3/1966 | Welsh | 360/42 |
| 3,496,557 | 2/1970 | Lowrance | 360/42 |
| 3,696,255 | 10/1972 | King et al. | 360/42 |
| 3,736,581 | 5/1973 | Breikss | 360/43 |
| 3,828,167 | 8/1974 | Goldfarb | 360/42 |
| 3,852,811 | 12/1974 | Aghazadeh | 360/51 |
| 4,032,915 | 6/1977 | Shanks et al. | 360/44 |

*Primary Examiner*—Vincent P. Canney
*Attorney, Agent, or Firm*—Charles R. Lewis

[57] ABSTRACT

A digital data encoding and reconstruction circuit is improved by substantially eliminating erroneous and unwanted data readings due to imperfections in the magnetic recording media, excessive shoulders, electronic noise and the like by the use of pulse width discrimination. Since the time between successive transitions caused by valid data is greater than the time duration between transitions caused by erroneous signals, a counter or timer is used to determine and select only transitions caused by valid data in the read signal.

8 Claims, 4 Drawing Figures

DIGITAL DATA ENCODING AND RECONSTRUCTION CIRCUIT

CROSS-REFERENCE TO RELATED PATENT

The invention disclosed and claimed herein is for an improvement over the invention disclosed in U.S. Pat. No. 3,852,811, which issued on Dec. 3, 1974.

The invention disclosed and claimed in the above referenced patent performs exceedingly well under normal operation conditions. However, under some operating conditions it was found that imperfections in the magnetic recording media, such as various plating imperfections in the case of magnetic disks and coating imperfections in the case of magnetic tape, excessive shoulders caused by recording alternate ones and zeros and other electrical sources of noise created distortions in the playback signal that were erroneously interpreted as valid data. The present invention virtually eliminates such errors by the use of pulse width discriminator means which enables playback signal transitions caused by valid data to be distinguished from playback signal transitions caused by unwanted, erroneous signals. This is made possible by the fact that the unwanted, erroneous signals cause two successive playback signal transitions to occur in less time than it is possible for two successive transitions to occur in the playback signal due to valid data. A counter is utilized to distinguish between time intervals associated with valid data signal transitions and erroneous, unwanted, transitions in the playback signal.

Accordingly, one object of this invention is to provide an improved digital data encoding and reconstruction circuit.

Another object of this invention is to provide an improved data encoding and reconstruction circuit that materially reduces errors in the reconstructed data due to imperfections in the magnetic recording media, excessive shoulders and other electrical noise associated with the storage system.

BACKGROUND OF THE INVENTION

All digital computing equipment requires some type of memory storage, and most of the present day computer memories store the data in binary form on moving magnetic medium, such as a magnetically coated tape, drum, or rotating disc. Because they are unlimited in length, tape memories have a very large storage capacity potential but are considered comparatively slow because of the time required to search for particular data along the length of the tape. Disc and drum memories have very fast access to the data because, as the disc or drum rotates, the data passes under the transducer at each revolution. However, disc or drum memories have a limited capacity depending upon the number of tracks of data, the length of the tracks, and the bit density of recorded data in the tracks. In order to obtain the maximum storage capacity from a given size rotatable memory, it is necessary to select an efficient data recording system.

The simplest magnetic recording method is commonly referred to as the "return to bias" method, which records on the magnetic medium a pulse representing a binary "one" and the lack of a pulse representing a binary "zero." Although a simple and inexpensive system, this method of recording is not widely used because the two flux changes required for recording each bit produces a relatively slow recording system and also because the absence of any recording represents a binary zero and thus may result in readout error.

The possible errors introduced by the lack of a signal being read as a binary zero is overcome by a recording system referred to as the "return to zero" method of recording, in which a binary one is represented by a recorded pulse of one polarity and a binary "zero" by a pulse of the opposite polarity. While solving the problem of possible readout error from lack of signal, this method of recording is relatively slow and not widely used because it is, again, a double transition method requiring two flux changes per recorded bit.

A system which apparently obviates all of the disadvantages referred to above is the "non-return to zero" (NRZ) method, which is fast in that there is a maximum of one flux change per bit, i.e., the transducer current switches only when a binary "one" is recorded. Although very popular, this NRZ method has its disadvantages. Because there is not always an output for each bit sensed by the transducer, the method is not self-clocking and it is, therefore, necessary to record a clock track along with the data tracks. Furthermore, the method is subjected to amplitude dependent time errors, that is, since data is contained only in flux changes, the amplitude of the read-back signal will vary with the data pattern. Another problem of NRZ recording is associated with the existence of high frequency noise at the baseline of the signal in patterns that contain fewer flux changes. The existence of this type of noise increases the error probability and the necessary complexity of the read amplifier design.

Still another method of recording is known as "phase modulation recording" in which the recording current wave form consists of a series of complete cycles a "one" differing from a "zero" only in phase. Although phase modulated signals require a maximum of two flux changes per bit, it is possible to record by this method at a very high rate and at bit densities approaching that of the NRZ method of recording. Furthermore, since there is an output signal for each recorded bit, this system can be made self-clocking and the output information can be correctly interpreted without the necessity of a separately recorded clock signal, as is required in the NRZ method.

The invention disclosed in the referenced patent provided a method and circuitry for doubling the bit density of a phase modulated data signal and, therefore, the memory capacity of a magnetic recording medium. The invention in the referenced patent accomplished this in circuitry that accepts a binary input signal, converts it into a phase modulation double pulse signal, and then modifies that signal into a single pulse signal which may be recorded at high-bit densities. The original input signal is then reconstructed in the demodulation circuitry by first shaping and amplifying the playback signal read by the magnetic transducer, detecting the edges of the shaped signal, and then gating those edges with a self-clocking signal. The invention in the referenced patent generated the self-clocking signal by circuitry including a voltage controlled oscillator operating in a phase locked loop at a frequency that is eight times the master clock frequency, a four-bit binary counter operated by the voltage controlled oscillator and reset by pulses representing the edges of the readback signal, and a decoding matrix coupled to the output of the counter for generating pulses that are substantially one-quarter, three-quarters, one and one-quarter, and one and three-quarters of the master clock bit time.

BRIEF DESCRIPTION OF THE INVENTION

Briefly described, the invention disclosed in the referenced patent is improved to materially reduce data errors caused by imperfections in the magnetic media on which the data is stored, excessive shoulders, electrical noise and the like by pulse width descriminator means which will recognize a transition in the shaped playback signal as representing valid data only if a subsequent transition of the playback signal occurs after a predetermined time interval. More specifically, the pulse width discriminator means includes a pair of flip-flops each of which will change state in response to opposite going transitions of the playback signal. The output of the flip-flops is used to control a counter which in turn controls the state of the flip-flops. When a valid transition in the playback signal occurs, one of the two flip-flop is set and the counter begins counting. If no further transitions in the playback signal occur during a predetermined time interval, the counter will reach a predetermined count at which time both flip-flops are reset and a spike indicative of a valid data transition is generated. The spike will be delayed with relation to the transition of the playback signal by the time required for the counter to reach the predetermined count. When an unwanted, erroneous transition in the playback signal occurs, it will generally be followed, or preceeded, by another transition that prevents the counter from being stepped to the predetermined count and a spike is not generated for either transition. In this manner, data errors in the playback signal are substantially reduced.

DESCRIPTION OF THE DRAWINGS

The subject invention will be clearly understood from consideration of the following detailed description taken in conjunction with the accompanying drawings wherein like reference characters designate like or corresponding parts throughout the several views, and wherein.

DESCRIPTION OF THE PREFERRED EMBODIMENT

Figure 1:
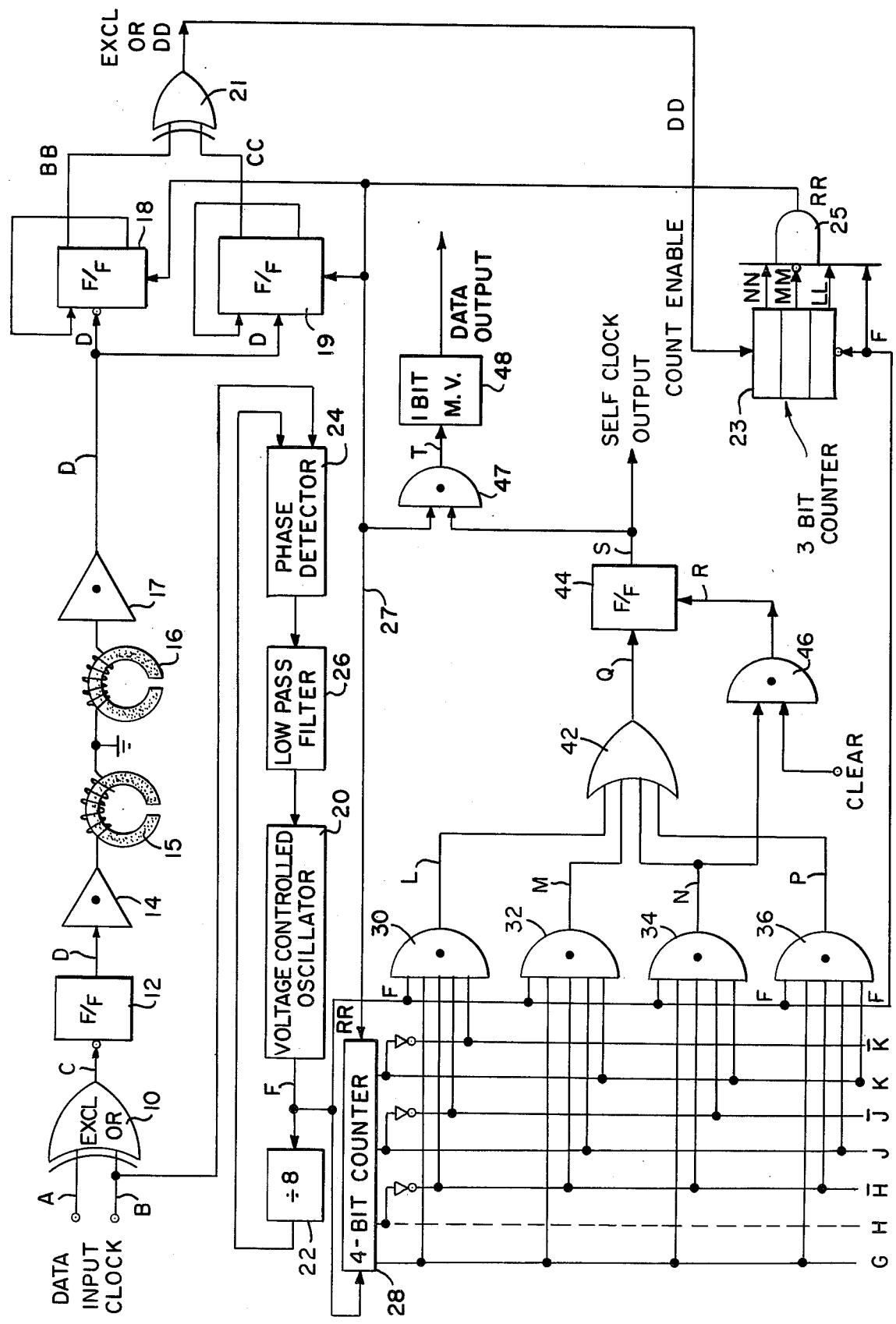
FIG. 1 is a block diagram of a preferred embodiment of the present invention.

It is to be noted that the block diagram of FIG. 1 makes use of capital letters, such as at the output terminals of each block in the diagram. These letters refer to correspondingly identified wave forms in FIGS. 2, 3 and 4. Referring to both FIGS. 1 and 2 of the drawings, a binary data input signal A and an externally generated square wave master clock signal B are introduced into an Exclusive OR gate 10, which produces a high output signal C when there is a high input signal at either one, but not both, of its input terminals. It will be noted that in the divided signal shown in wave form D, a binary "one" is represented by one midbit transition; that is, there is a transition when there is a reversal in the clock signal B at the midpoint in any binary "one" signal in the input data wave form A. On the other hand, a binary "zero" is represented by the absence of the transition in the case of a single "zero," but with a transition at the beginning of each subsequent bit between contiguous binary "zero's." As shown in waveform A of FIG. 2, the data input to gate 10 is arbitarily selected as the binary number "101011001." As will subsequently be explained in connection with waveform S generated by the demodulation circuitry, the first two input bits, "1," "0," are considered a preamble to be followed by the actual data bits.

The output signal C from Exclusive OR gate 10 is the phase modulation representation of the data contained in waveform A. It can be seen in waveform C that a binary "one" is represented by a signal having a high portion followed by a low portion and the binary "zero" signal has a low portion followed by a high portion. The phase modulation representation of alternating bits such as "1010" has only one transition per bit which, upon recording, would be one magnetic flux change per bit. However, the phase modulation representation of non-alternating bits, such as "11" or "00" can be seen in waveform C to require additional transitions and flux changes. The packing density of a moving magnetic medium and therefore the capacity of the magnetic memory is limited by the number of flux changes per unit length. Thus, the bit packing density and the capacity of a memory can be doubled if the same data can be recorded with only half as many flux changes per unit length. Accordingly, the phase modulation signal C from Exclusive OR gate 10 is applied to flip-flop 12 which divides the phase modulation waveform C to produce the recording current as shown in waveform D. Flip-flop 12 may be a JK flip-flop with the J and K terminals connected to the clock input so that the flip-flop switches only when its input signal C drops from high to low. This modified phase modulation signal D is then applied to a write amplifier 14 and the signal is recorded by transducer 15.

The recorded signal is demodulated by first reading the magnetic medium with transducer 16 and applying the signal to read amplifier 17. Read amplifier 17 contains the necessary circuitry well known in the art to convert the analog signal from transducer 16 into a square wave output, as illustrated in waveform D of FIG. 2.

In a manner that is described hereinbelow in detail a pair of flip-flops 18 and 19, an Exclusive OR gate 21, an AND gate 25 and a three bit counter 23 are utilized to sense all transitions (high to low and low to high) of the read amplifier 17 output signal D to produce a series of very narrow, delayed, pulses RR on lead 27 corresponding to valid data transitions. To distinguish very narrow pulses from pulses having a significant width, the very narrow pulses will hereinafter be referred to as spikes. Accordingly, the spikes 37, 38, 39, 40, 41 and 43 in the waveform RR correspond to delayed, valid data transitions of the divided playback signal D.

Figure 2:
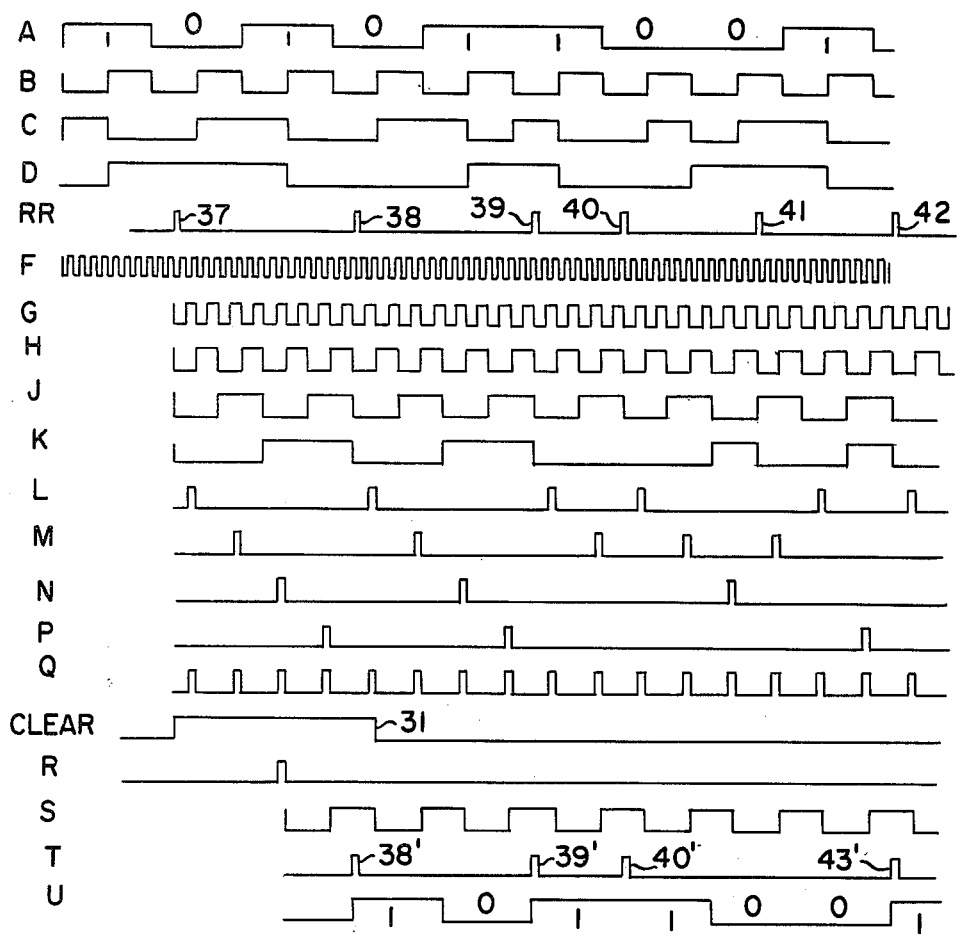
FIGS. 2, 3 and 4 illustrate idealized waveforms of various signals that appear throughout the system illustrated in FIG. 1.

In order to reconstruct the waveform of the original input data A, it is first necessary to generate a new clock signal that is identical with signal B of FIG. 2, but which will be phased differently in order to cooperate with the spikes in the waveform RR. The self-clock generating circuit includes a voltage controlled oscillator 20 which may operate at a frequency approximately equal to eight times that of the master clock frequency of waveform B. The output of oscillator 20 is applied to a "divide by eight" circuit 22 which may be comprised of a series of flip-flops and which produces at its output a frequency that roughly corresponds to the frequency of the master clock. The output of circuit 22 is then introduced, along with the master clock signal B, to a phase detector 24 which detects any differences in the phase between the divide circuit 22 and the master block B and produces an error signal that is proportional to the difference. This error signal is supplied through a low pass filter 26 to the voltage controlled oscillator 20 which is readjusted by the error signal to generate an output which is precisely eight times the frequency of the master clock as illustrated in the waveform F of FIG. 2.

The high-frequency output of oscillator 20 is applied to a four-bit binary counter 28 which produces at its four outputs G, H, J, and K signals that are, respectively, twice, four times, eight times, and sixteen times the pulse length of the high frequency signals F from oscillator 20. Since oscillator 20 produces signals that are eight times the frequency of the master clock signal B, or in other words, one eighth the pulse length of the master clock pulses, the outputs of the four-bit counter 28 would be, respectively, equal to one quarter, one half, equal to, and twice the pulse length of the master clock signal, B. As illustrated in FIG. 1, the spikes in the waveform RR are coupled to the reset terminal of the counter 28 so that the spikes will, when they occur, reset the counter 28 to "zero."

The purpose of the counter 28 is to obtain output pulses ocurring at periods of one-quarter, three-quarters, one and one-quarter, and one and three-quarters bit time. Accordingly, the output of the counter 28 is coupled into a decoding matrix which may include each of the four outputs of the counter as well as the inverted four outputs. To obtain the actual bit position signals indicated above, it is not necessary to obtain the inverted output of the first bit G nor the true output of the second bit H. The one quarter pulse L, that is, the first pulse generated one quarter of a bit time after the counter 28 has been reset, is obtained from an AND gate 30 having five inputs coupled to receive the signal F from oscillator 20, the first count G from counter 28, and the inverted second, third, and fourth counts, $\overline{H}$, $\overline{J}$, and $\overline{K}$, respectively. Similarly, the three-quarter pulse M is obtained from AND gate 32 which is coupled to receive the signals F, G, $\overline{H}$, J, and K. The one and one-quarter pulse N is obtained through AND gate 34 which is coupled to receive signals F, G, $\overline{H}$, $\overline{J}$, and K. The one and three-quarters pulse P is obtained from AND gate 36 which is coupled to receive signals F, G, $\overline{H}$, J, and K.

In the event a spike in the waveform RR occurs during the binary count, the counter 28 is instantly reset to zero to assure that the spikes RR are time-synchronized with the output of the counter 28 as the various counts proceed. FIG. 2 illustrates that the counts L, M, N, and P progress through one cycle when a spike in the waveform RR represented by the numeral 38 occurs. In this particular instance, spike 38 and subsequent spike 39 occurred to reset the counter 28 at the end of its normal count; however, the next subsequent spike 40 is seen to occur when counter 28 has progressed only through a portion of its normal cycle. The occurrence of pulse 40 therefore resets the counter 28 to "zero" and also assures that the new count is synchronized with the occurrence of the spike 40.

Gates 30, 32, 34, and 36 have their output coupled to the input of an OR gate 42, which produces a series of output spikes Q, the spacing of which corresponds to one half cycle of clock B time. In order to generate a self-clocking signal, these spikes Q are applied to a flip-flop 44 which is preferably a JK flip-flop with the J and K terminals connected to the input clock terminal so that the flip-flop 44 will change state coincidently with the arrival of each input spike Q.

It is important that flip-flop 44 produce a properly phase output signal, other wise there will be an erroneous reconstruction of the original data input signal at the output terminal of the demodulator. Therefore, flip-flop 44 must be forced into its low state at the appropriate time at the beginning of reading of each data block. When a data block is to be read it is first necessary to apply a "clear" signal 31 which may be two or three data bits in length, to one input terminal of an AND gate 46, the second input terminal of which is connected to the output of AND gate 34. It can now be understood why it is necessary to provide a preamble such as a "one" followed by a "zero" before the data information is recorded into the system. A preamble of a "one" and "zero" assures the presence of a spike in the proper position in the train of spikes N which when gated with the "clear" signal in AND gate 46, produces an output signal R to the reset terminal of flip-flop 44. This signal R at the reset terminal forces the flip-flop 44, into its low or false state at a point corresponding to the presence of the first spike N from AND gate 34. Therefore, the first transition in the output signal S of flip-flop 44 is a high to low, signal corresponding to the spike that was generated as a result of the preamble signal originally applied to the input data terminal of gate 10.

The properly phased self-clock output pulses S generated in flip-flop 44 are applied to AND gate 47 along with the spikes in waveform RR to produce output spikes T. It will be noted in comparing the spikes in waveform RR with the self-clock signal S that the spikes always appear near the center or peak of the self-clock waveform S, and not near a transition point. This is, of course, due to the fact that the self-clocking signal S was generated from pulses L, M, N, and P that are generated at the odd quarter-bit points following the spikes in the waveform RR. Spikes 38', 39', 40' and 43' in the waveform T correspond to the spikes 38, 39, 40 and 43 in the waveform DD. It will be noted that some of the spikes, such as spikes 37 and 41 in the waveform RR, are not carried down to the output spikes T because they failed to pass through AND gate 47 at the proper self-clock S timing position.

Output spikes T produced by AND gate 47 are applied to the input terminal of a retriggerable monostable multivibrator 48 which has been preadjusted to switch at one bit time. Accordingly, upon the arrival of each input spike in the waveform T, multivibrator 48 produces a data output pulse U of one bit length. It will be noted that the data output pulses in waveform U of FIG. 2 corresponds precisely with the input data waveform A less the two preamble bits "one" and "zero." The circuitry has faithfully reproduced the original input data after having divided the signal at flip-flop 12 so that the recorded data contained no more than one flux change per bit. It can, therefore, be appreciated that the recorded data in waveform D can be stored at twice the bit density of the original input data in waveform A. Such an increased density doubles the storage capacity of the magnetic memory.

Figure 3:
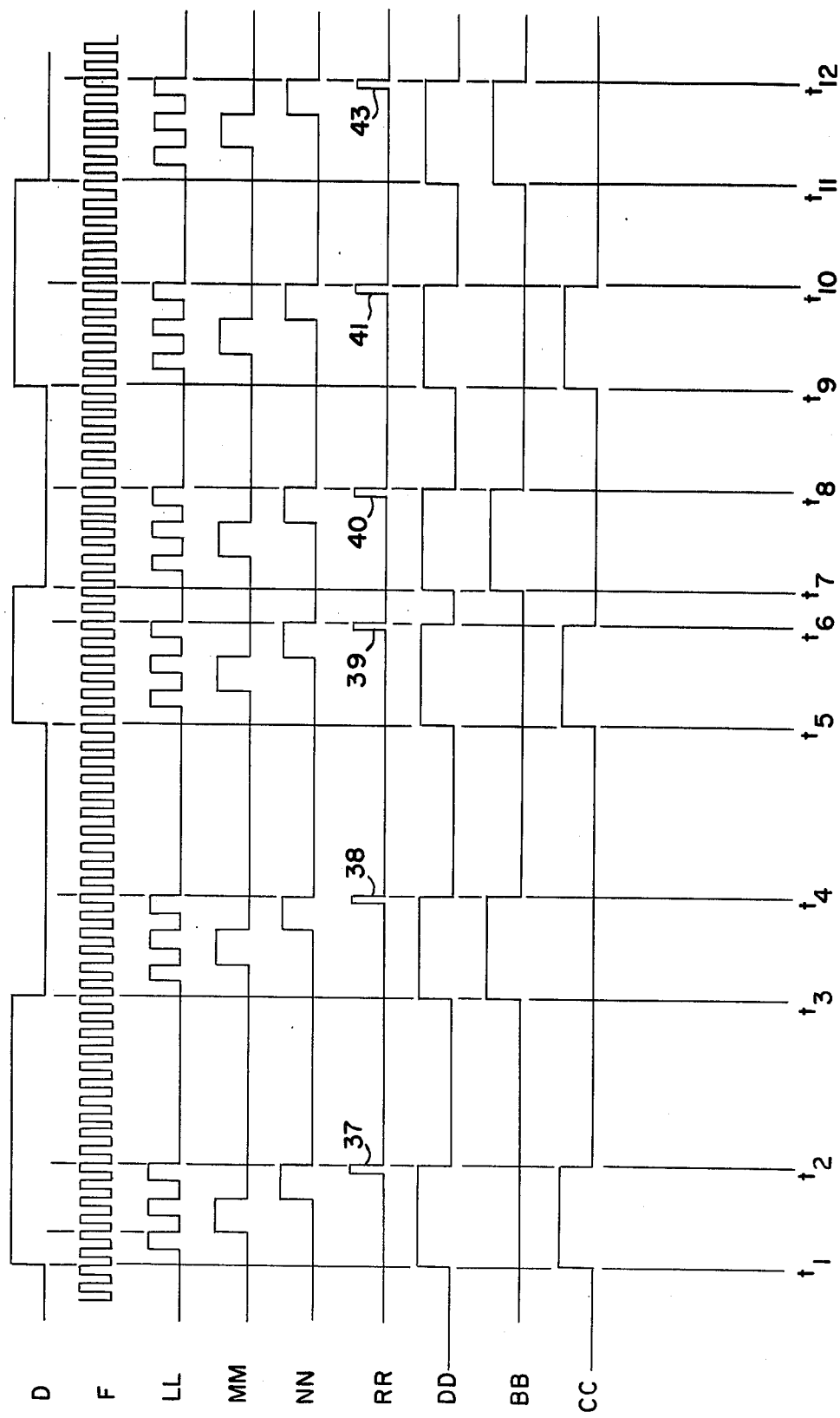

Referring now to FIGS. 1 and 3, the generation of the spikes in the waveform RR will now be explained. The divided signal D from the read amplifier 17 is applied to the clock input of the two D type flip-flops 18 and 19. Each flip-flop 18 and 19 has its $\overline{Q}$ output connected back to the d input thereof and the spikes in the waveform RR are applied to the reset input of each of the flip-flops 18 and 19. Flip-flop 18 changes state with each high to low transition of the D signal and is reset by the spikes RR to produce signal BB at the output thereof. Flip-flop 19 changes state with each low to high transition of the D signal and is reset by the spikes RR to produce signal CC at the output thereof. The BB and CC signals are applied as inputs to the Exclusive OR gate 21 to produce the signal DD which is high whenever either the BB signal or the CC signal, but not both, is high.

When high, the DD signal enables the counter 23 which preferably constitutes a three bit counter that divides the F pulses applied thereto by eight. The counter 23 provides a first output LL that is twice the pulse width and, therefore, half the frequency of the F signal; a second output MM that is twice the pulse width and, therefore, half the frequency of the LL signal; and a third output NN that is twice the pulse width and, therefore, half the frequency of the MM signal. When the DD signal goes low, the counter 23 will be reset to a zero count and disabled. As will be apparent to those skilled in the art, the counter 23 may constitute three flip-flops (not shown) interconnected in any number of well known ways. The LL and NN signals, the complement of the MM signal and the FF signal are coupled to the input of the AND gate 25. When all of these inputs are high simultaneously, the AND gate 25 is enabled causing its output to go high. This high level resets the flip-flops 18 and 19 which disables the Exclusive OR gate which in turn resets the counter 23 and disables the AND gate 25. The enabling and subsequent disabling of the AND gate 25 generates the spikes, such as spikes 37, 38, 39, 40, 41 and 43, in the waveform RR.

The D and F waveforms discussed above are reproduced in FIGS. 3 and 4 as an aid in explaining the generation of the RR signals and the elimination of data errors. At time $T_1$ the D signal goes from low to high thereby setting flip-flop 19 with flip-flop 18 remaining reset. Accordingly, the signal CC goes high and the signal BB remains low. This results in the output DD of the Exclusive OR gate 21 going high which starts the counter 23 counting. The LL, MM and NN signals from the counter 23 are applied to the AND gate 25 and just prior to time t2 the LL, NN, complement of MM and F waveforms are high which results in the AND gate 25 being enabled and its output RR goes high. This high in the RR waveforms resets the flip-flop 19 resulting in both the BB and CC signal levels being low which in turn causes the output DD of the Exclusive OR gate 21 to be low thereby disabling and resetting the counter 23 to zero which results in the AND gate 25 being disabled and its output RR goes low. This enabling and disabling of the AND gate 25 produces the first spike 37 in the waveform RR. As shown in FIGS. 2 and 3, this spike 37 is delayed from the time $T_1$ at which the D signal went from low to high by about the time required for the F pulses to step the counter 23 up to a count of five (101) from a count of zero. In one embodiment of the present invention which was constructed this delay amounted to approximately three hundred nano seconds.

At time t3 the D signal goes from high to low and subsequently thereto at time t4 a second spike 38 is generated in the waveform RR in a manner similar to that described above except that in this instance the flip-flop 18 is set during the time interval t3 to t4 rather than flip-flop 19. The remaining spikes 39, 40, 41 and 43 in the waveform RR are generated in a like manner.

Figure 4:
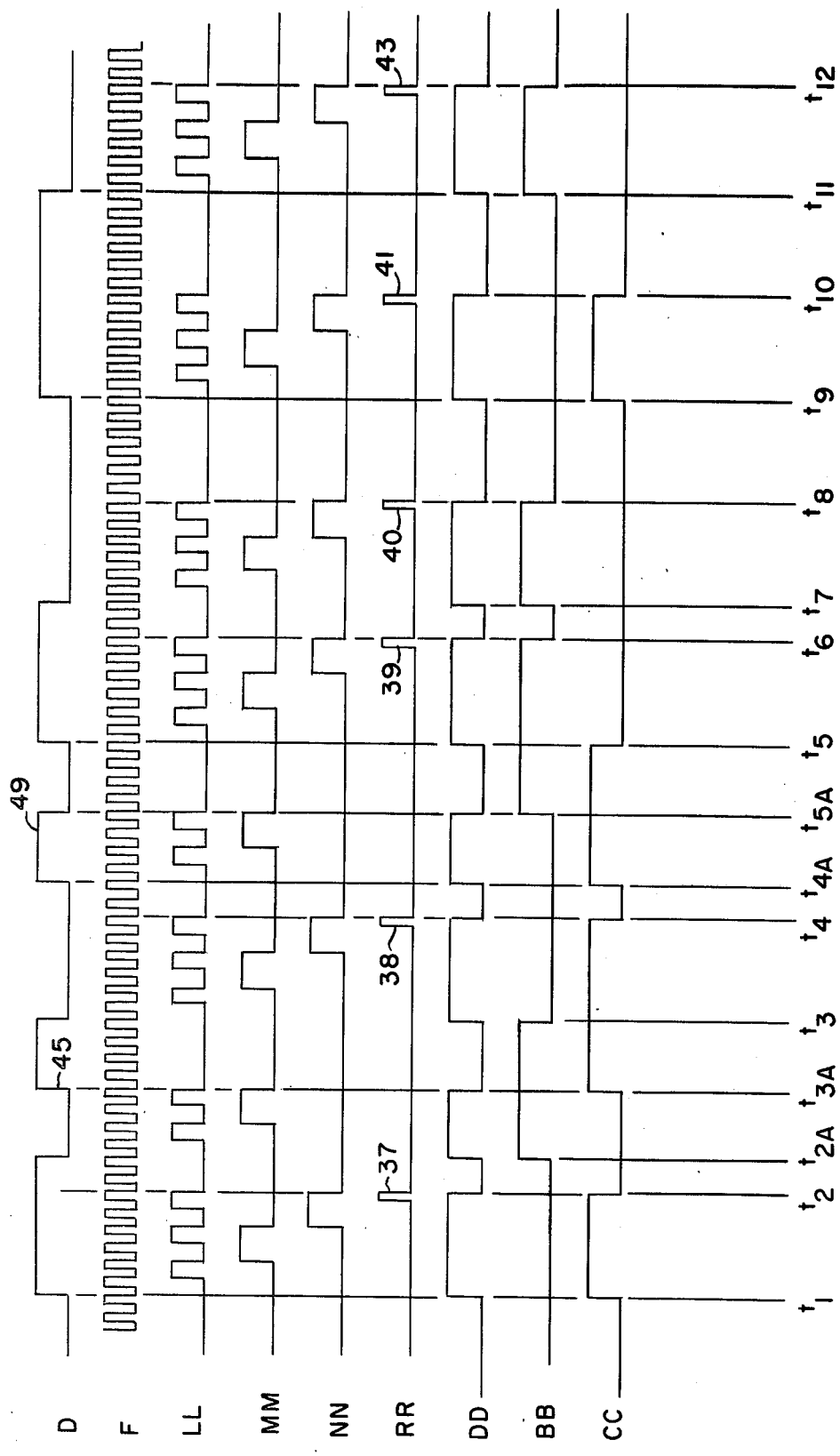

Assume now that imperfections in the magnetic recording media, noise, excessive shoulders and the like result in an erroneous signal D from the amplifier 17. Experience has shown that these erroneous signals will generally cause a shorter pulse width in the waveform D than that which occurs between valid data transitions in the signal D from the amplifier 17. Referring now to FIGS. 1 and 4, assume an erroneous, negative level, unwanted change 45 occurs in the D signal level for the time interval t2a to t3a during the time interval t1 to t3 during which the level of the D waveform should be high as shown in FIGS. 2 and 3. The first spike 37 in the waveform RR is generated as described above. At time t2a the erroneous, unwanted high to low transition in the waveform D will set the flip-flop 18, enable the Exclusive OR gate 21 and enable the counter 23 to begin producing the LL, MM and NN signals. Before the counter 23 can be stepped to a count of five by the F pulses, at which time the AND gate 25 would be enabled, the unwanted, erroneous pulse 45 causes the waveform D to return to a high level at time t3a. Since the AND gate 25 was not enabled during the time interval t2a to t3a, the flip-flop 18 remains set. The low to high transition at time t3a will set the flip-flop 19 and with both signals BB and CC high, the Exclusive OR gate 21 will be disabled at time t3a. The resulting low level in the DD waveform resets the counter 23 to zero and prevents the counter 23 from being stepped by the F pulses. As will now be apparent, the occurrence of the unwanted pulse 45 in the waveform D does not produce any spikes in the waveform RR. The spike 38 in the waveform D is generated at time t4 in a manner as described above as a result of the valid transition of the D waveform at time t3 which changes the state of the flip-flop 18 to enable the Exclusive OR gate 21 by flip-flop 19 being set.

Assume now that an erroneous, positive level, unwanted change 49 occurs in the D signal level for the time period t4a to t5a during the time interval t3 to t5 during which the level of the D waveform should be low as shown in FIGS. 2 and 3. At time t4a the erroneous, unwanted low to high transition in the waveform D will set the flip-flop 19, enable the Exclusive OR gate 21 and enable the counter 23 to begin producing the LL, MM and NN signals. Before the counter 23 can be stepped to a count of five by the F pulses, at which time the AND gate 25 would be enabled, the unwanted, erroneous pulse 49 causes the waveform D to return to a low level at time t5a. Since the AND gate 25 was not enabled during the time interval t4a to t5a, the flip-flop 19 remains set. The high to low transition at time t5a will set the flip-flop 18 and with both signals BB and CC high, the Exclusive OR gate 21 will be disabled at time t5a. The resulting low level in the DD waveform resets the counter 23 to zero and prevents the counter 23 from being stepped by the F pulses. As will now be apparent, the occurrence of the unwanted pulse 49 in the waveform D does not produce any spikes in the waveform RR. The valid transition in the waveform D at time t5 changes the state of the flip-flop 19 which permits the output BB of the flip-flop 18 to enable the Exclusive OR gate 21. This results in the spike 39 occurring, in a manner as described, in waveform D at time t6.

As will now be apparent, the system illustrated in FIG. 1 reduces erroneous data readings due to imperfections in the magnetic recording media, noise, excessive shoulders and the like that appear in the output D of the amplifier 17 as erroneous and unwanted negative and/or positive level pulses or spikes. These erroneous signals 45 and 49 in the amplifier 17 output D are eliminated as long as their time duration in waveform D does not exceed the time required for the counter 23 to be stepped by the F pulses from a count of zero to a count of five. Also, these erroneous signals, or pulses, have no effect on deriving spikes in the waveform RR from valid data transitions in the waveform D as long as they occur after the counter 23 has been stepped to a count of five as a result of a valid transition in the waveform D. Experience, has shown that the great majority of erroneous signals, or pulses, that do occur have a duration and time occurrence that enables them to be eliminated by the system illustrated in FIG. 1.

What is claimed is:

1. Digital magnetic recording and reproducing apparatus that materially reduces data errors due to imperfections in the magnetic recording medium, excessive shoulders, electrical noise and the like comprising:
   means for recording onto said magnetic medium a phase modulated data signal;
   means for reading and shaping said magnetically recorded signal into a pulse waveform to reproduce said recorded data signal; and
   means coupled to receive said reproduced data signal for producing a spike signal for each transition in said reproduced data waveform except for those pulses therein having less than a predetermined time duration;
   said spike signal producing means including
   a source of timing pulses,
   a counter coupled to receive said timing pulses for determining said predetermined time duration, and
   first gating means coupled between said counter and said reproduced data signal for enabling said gate to selectively enable said timing pulses to step said counter in response to at least some of said transitions in said reproduced data signal.

2. The apparatus according to claim 1 further including
   second gating means coupled to said counter and responsive to a predetermined count therein for resetting said counter and disabling said first gating means.

3. The apparatus according to claim 2 wherein said second gating means also generates one of said spikes each time said predetermined count occurs in said counter.

4. The apparatus according to claim 1 further including
   an Exclusive OR gate having its output coupled to said counter,
   a pair of flip-flops,
   said Exclusive OR gate having as inputs thereto the outputs of said flip-flops,
   said reproduced data signal coupled to the input of each of said flip-flops,
   one said flip-flop operable to change from one stable state to another stable state in response to one transition of said reproduced data signal and said other flip-flop operable to change from one stable state to another stable state in response to an opposite transition of said reproduced data signal whereby the output of said Exclusive OR gate enables said counter to be stepped by said timing pulses in response to at least some of said transitions in said reproduced data signal.

5. The apparatus according to claim 4 further including
   an AND gate coupled between said flip-flops and said counter and responsive to a predetermined count in said counter for resetting said flip-flops to disable said Exclusive OR gate and reset said counter.

6. The apparatus according to claim 5 wherein said AND gate also generates one of said spikes each time said predetermined count occurs in said counter.

7. The apparatus according to claim 1 further including
   means for generating a self clocking signal, and
   means for gating said spike signals with said self clocking signal to reproduce the data that was phase modulated prior to being recorded.

8. The apparatus according to claim 1 wherein said means for recording the phase modulated data signal onto said magnetic media divides said data signal to one half the frequency of the original phase modulated data signal.

* * * * *